UNITED STATES PATENT OFFICE.

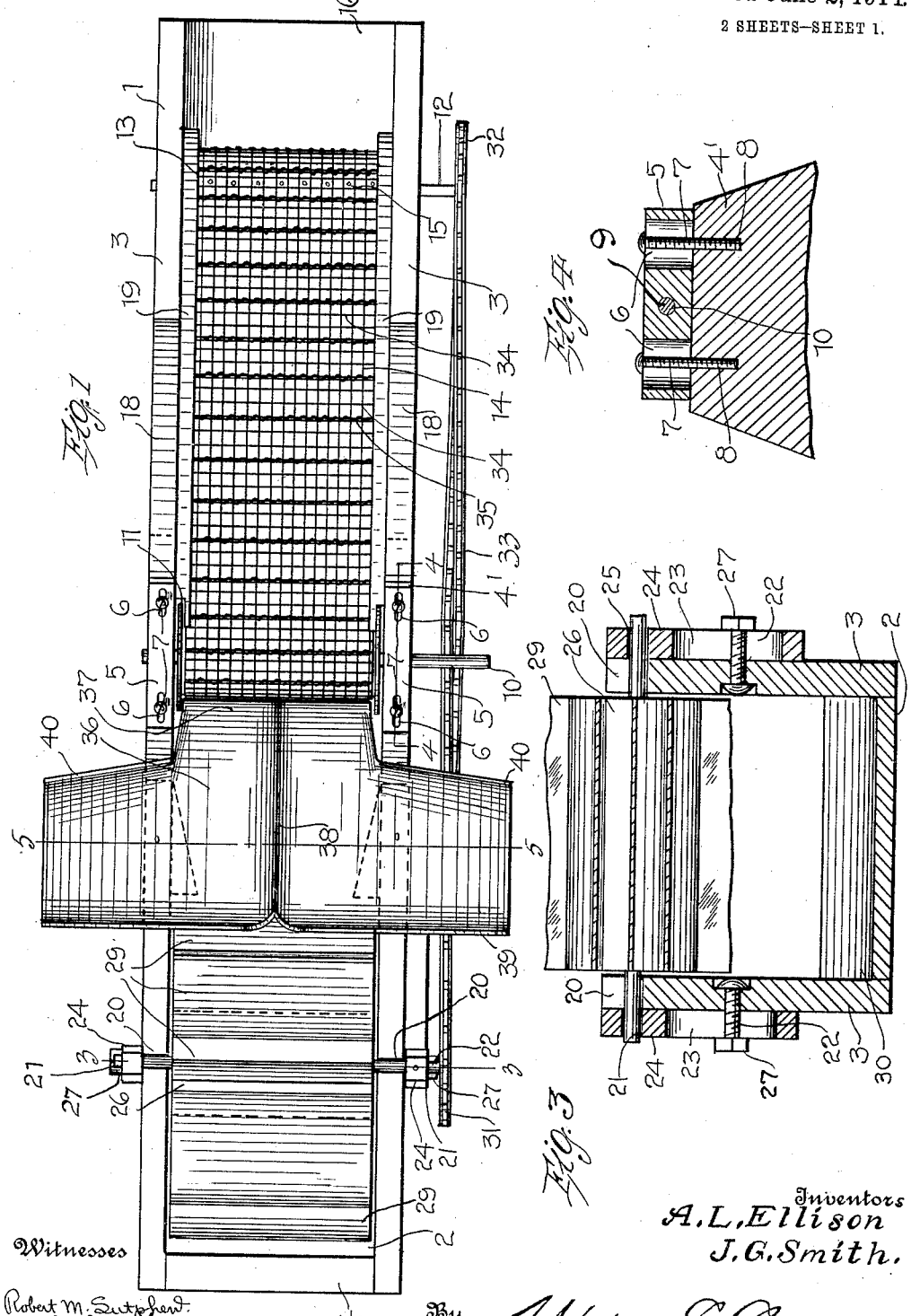

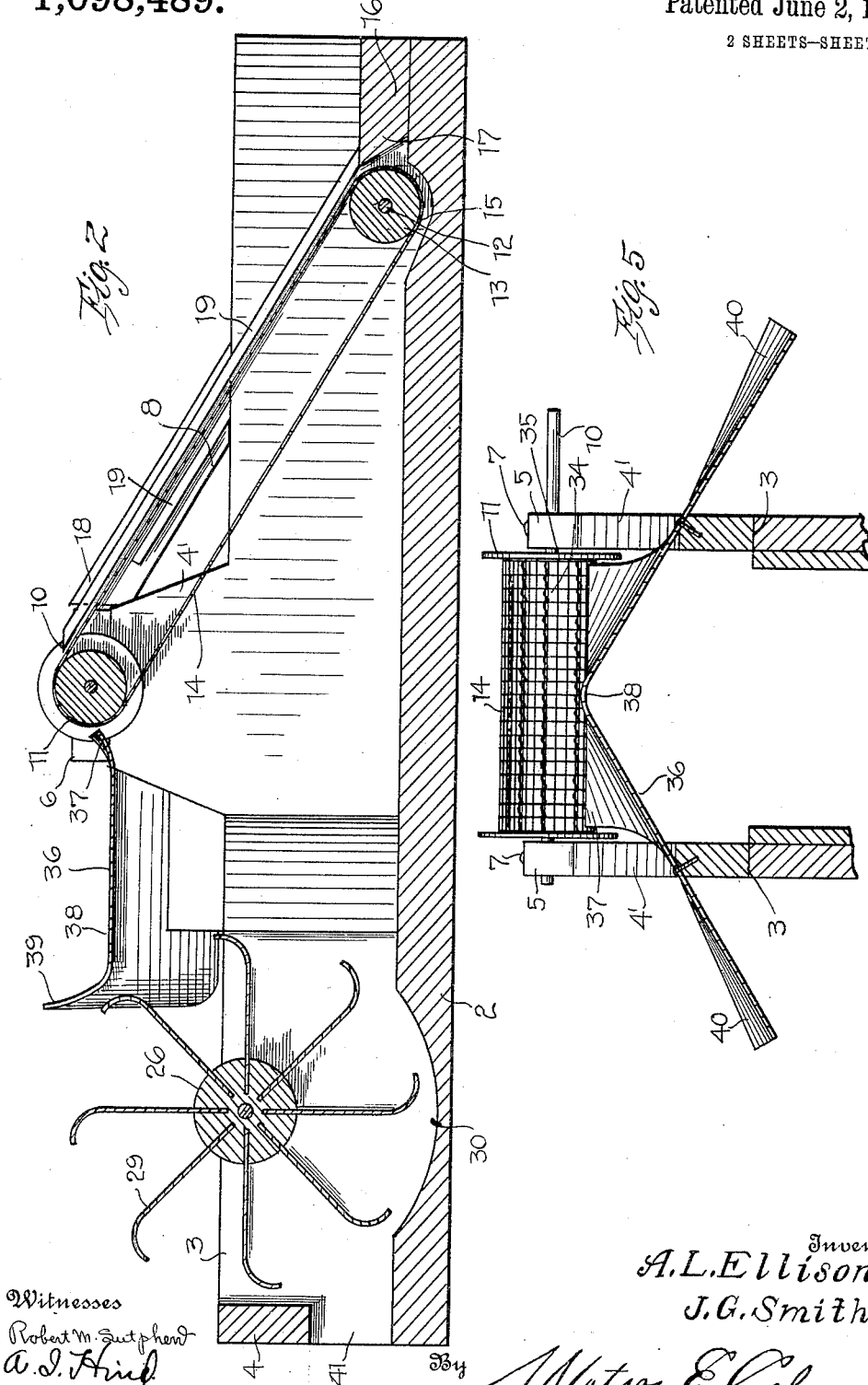

ARTIE L. ELLISON AND JOSEPH G. SMITH, OF EDGEWOOD, CALIFORNIA.

FISH-SCREEN.

1,098,489.     Specification of Letters Patent.     Patented June 2, 1914.

Application filed February 3, 1913. Serial No. 746,073.

*To all whom it may concern:*

Be it known that we, ARTIE L. ELLISON and JOSEPH G. SMITH, citizens of the United States, residing at Edgewood, in the county of Siskiyou and State of California, have invented certain new and useful Improvements in Fish-Screens, of which the following is a specification, reference being had to the accompanying drawings.

This invention relates to improvements in fish screens which are placed in the heads of irrigating ditches to prevent fish from going out of natural streams into the ditches and thereby become destroyed.

An object of this invention is the provision of the device of this character which comprises an inclined revolving screen which is disposed within a flume and extends upwardly therefrom and out of the water so as to prevent the fish from passing into the ditch.

Another object of this invention is a provision of the device of this character comprising a box or flume, in which are disposed an inclined revolving endless screen and a water wheel, the screen being operatively connected with the water wheel so that upon rotation of the wheel, the screen will be revolved and fish will be prevented from passing into the ditch, while at the same time debris will be automatically removed from the flume.

A still further object of this invention is a provision in the device of this character comprising a flume, having means connected thereto adjacent the upper or discharge end of the screen to convey debris which may have been elevated by the screen to the opposite sides of the flume to prevent the debris from being carried into the irrigating ditches.

With these and other objects in view, our invention consists in certain novel constructions, arrangements and combinations of parts to be hereinafter more fully described, claimed and illustrated in the accompanying drawings, in which, Figure 1, is a top plan view of the device. Fig. 2, is a longitudinal section thereof. Fig. 3, is a section on the line 3—3 of Fig. 1. Fig. 4, is a section on the line 4—4 of Fig. 1. Fig. 5, is a section on the line 5—5 of Fig. 1.

Referring more particularly to the drawings, the numeral 1 designates a box or flume which comprises a bottom wall 2, side walls 3 and the end wall 4. The side walls 3 are formed on the upper edges intermediate of their ends with upstanding flanges 4', upon the upper edges of which are mounted adjustable bearings 5. The bearings are provided with the longitudinal slots 6 near their opposite ends in which are disposed screw bolts 7, which are adapted to engage the threaded openings 8 formed in the flanges 4'. Each of the bearings 5 is also formed intermediate of its ends with suitable alined transverse openings 9 in which are disposed the opposite ends of a shaft 10 to which a drum 11 is keyed. A shaft 12 is rotatably mounted in the side walls 3 of the flume near the floor and adjacent the inner or inlet end thereof, and keyed to the shaft between the walls of the flume is a drum 13, the drums 11 and 13 being adapted to support an endless screen 14. Suitable brads or studs 15 are secured in the periphery of the drum 13, the studs being adapted to extend through the meshes of the screen to prevent the same from slipping when a heavy load is imposed there upon. A relatively low wall 16 is secured to the bottom wall 2 of the flume at the inner end thereof, and secured to the wall 16 is an inwardly extending member 17, the inner end of which is arranged adjacent the periphery of the drum 13 to prevent any trash from passing under the drum 13 and thence into the ditch. Inclined brace members 18 are connected at one of their ends to the flanges 4', and at their opposite ends to the walls 3 of the flume, and spaced guide strips 19 are secured to the inner faces of the brace members. The longitudinal edges of the screen being engaged between the guide strips to prevent sagging of the screen when a load of trash or debris is imposed there upon.

Formed in the side walls of the flume near the upper or discharge end thereof, are vertical slots 20 in which the opposite ends of a shaft 21 are slidably disposed. Projecting from the side walls 3 below the slots 20, are screw bolts 22, the outer or threaded ends of which are slidably disposed in longitudinal slots 23 which are formed in the vertically adjustable bearings 24. The opposite ends of the shaft 21 pass through openings 25 which are formed in the bearings 24 near the upper ends thereof, and mounted on the shaft between the walls of the flume is the water wheel 26. It will be seen from the drawings that the water wheel 26 may be adjusted vertically according to the height of the water within the flume, and the bearings 24 will be moved with the water wheel owing to the connection of the opposite ends of the shaft 21 with the bearings. The water wheel may be maintained in any desired position by tightening the nuts 27 which are threadedly disposed on the bolts 22, in jamming engagement with the outer face of the bearings 24 to maintain the bearings in the adjusted position. If desired washers may be arranged between the nuts and the bearings.

The water wheel comprises a drum 26 in which are secured a plurality of radially extended blades or paddles 29, the blades being curved at their free longitudinal edges so that the water is provided with broad impact surfaces as it passes through the wheel. The bottom wall 2 of the flume is concaved or grooved transversely as at 30 directly under the water wheel 26, the curved portions 29 of the paddles being adapted to extend within the concaved portion of the floor so that all the water passing into the flume must engage the blades of the wheel before passing out of the flume, so that the water wheel will turn when the water is running slowly, through the flume.

A sprocket wheel 31 is keyed to one end of the shaft 21, and a sprocket wheel 32 is keyed to one end of the shaft 12 of the lower drum 13, the sprocket wheels being operatively connected together by means of a crossed chain belt 33 so that upon rotation of the water wheel, the screen will be revolved. The screen 14 is preferably composed of a plurality of transverse screens 34, the screens being formed of wire mesh or other reticulated material, and are hingedly connected together as at 35. The joint or hinged connections between the sections provide a screen which is exceedingly flexible, and one which works over the rollers with a very slight friction.

Mounted on the walls of the flume between the drum 11 and the water wheel 26 is a discharge plate 36 which is adapted to convey any trash or debris which may be raised by the screen 14, to the opposite sides of the flume into suitable receptacles provided therefor. The plate extends transversely of the flume having its opposite sides disposed beyond the side walls thereof, the plate being formed with an inwardly extending flange 37 which extends between the upstanding flanges 4', the inner edges of the flange 37 being disposed under the drum 11 adjacent its periphery, so that none of the debris will be allowed to fall within the flume. The plate is bent transversely intermediate of its ends as at 38 to provide downwardly extending wings upon its opposite ends, the outer longitudinal edges 39 of the wings being curved upwardly to prevent any of the trash or refuse from passing over the plate and onto the water wheel. The inner longitudinal edges of the wings are also curved upwardly at their free ends as at 40 so that the wings will provide suitable guide ways or channels for conducting the refuse to the receptacles provided therefor. An opening 41 of suitable size is formed in the end wall 4 of the flume so that the water after passing through the wheel will escape from the flume into the ditch.

It will be understood that by providing adjustable bearings for the upper drum 11, the screen can be tightened or loosened when desired or may be readily removed from the flume. By removing the nuts 27 from the screw bolts 22, the bearing plates 24 may be removed from the ends of the shaft 21 so that the water wheel may be taken out of the flume. All of the working parts may be removed without taking the flume from the ditch, and the advantages of this construction may be readily appreciated.

If necessary, a discharge pipe which is inclined in one direction may be mounted on the walls of the flume, between the drum 11 and the water wheel 26. This construction will only be necessary in the event that the screen is used in mountainous regions, where a high wall is disposed on one side of the screen, so that it will be necessary to discharge the debris from the screen over the opposite side thereof.

While the construction illustrated in the accompanying drawings is the preferred embodiment of our invention, it will be understood that minor changes in construction may be resorted to, without departing from the spirit of the invention or sacrificing any of its advantages, as determined by the scope of the appended claims.

Having thus fully described our invention what we desire to claim and secure by Letters Patent is:—

1. A device of the class described comprising a box, a pair of shafts rotatably mounted in the sides of the box, an inclined sectional screen engaged around said shafts, a longitudinal arched discharge plate extending over the opposite sides of the box at the upper end of the screen and having its edges bent back to prevent material deposited upon the discharge plate by the screen from falling into the box, and a water wheel rotatably mounted in the box beneath the rear edge of the discharge plate and connected with the screen to operate the latter.

2. A device of the class described comprising an oblong box having one end open and its opposite end closed by an end board, said end board being provided with a suitable opening, the sides of the box being provided with oppositely upwardly directed portions, the bottom of the box being provided with a concave portion near its closed end, a water wheel mounted in the sides of the box above the concave portion of the bottom, an arched discharge plate positioned transversely across the upwardly directed portions of the sides and sloping downwardly upon opposite sides of the box, said discharge plate having its edges bent upwardly to prevent material from falling from the same into the box, one longitudinal edge of the discharge plate being above the water wheel, an inclined sectional endless screen, means for supporting the screen for operation in the box, the upper end of the screen extending over the remaining longitudinal edge of the discharge plate, and operative connections between the water wheel and the screen.

In testimony whereof we hereunto affix our signatures in the presence of two witnesses.

ARTIE L. ELLISON.
JOSEPH G. SMITH.

Witnesses:
E. H. CALDWELL,
GEO. W. DUNLAP.

Copies of this patent may be obtained for five cents each, by addressing the "Commissioner of Patents, Washington, D. C."